(12) United States Patent
Raguenet

(10) Patent No.: US 8,299,963 B2
(45) Date of Patent: Oct. 30, 2012

(54) ANTENNA WITH SHARED FEEDS AND METHOD OF PRODUCING AN ANTENNA WITH SHARED FEEDS FOR GENERATING MULTIPLE BEAMS

(75) Inventor: Gérard Raguenet, Eaunes (FR)

(73) Assignee: Thales (FR)

( * ) Notice: Subject to any disclaimer, the term of this patent is extended or adjusted under 35 U.S.C. 154(b) by 0 days.

(21) Appl. No.: 12/630,553

(22) Filed: Dec. 3, 2009

(65) Prior Publication Data

US 2010/0309050 A1 Dec. 9, 2010

(30) Foreign Application Priority Data

Dec. 5, 2008 (FR) ...................................... 08 06841

(51) Int. Cl.
*H01Q 3/00* (2006.01)
(52) U.S. Cl. ...................................................... 342/368
(58) Field of Classification Search .................. 342/368
See application file for complete search history.

(56) References Cited

U.S. PATENT DOCUMENTS

| | | | | | |
|---|---|---|---|---|---|
| 3,803,625 | A | * | 4/1974 | Nemit | 342/368 |
| 4,041,501 | A | * | 8/1977 | Frazita et al. | 343/844 |
| 4,652,880 | A | * | 3/1987 | Moeller et al. | 342/373 |
| 4,933,680 | A | * | 6/1990 | Shapiro et al. | 343/700 MS |
| 5,028,930 | A | * | 7/1991 | Evans | 342/373 |
| 5,572,222 | A | * | 11/1996 | Mailandt et al. | 343/700 MS |
| 5,661,494 | A | * | 8/1997 | Bondyopadhyay | 343/700 MS |
| 5,955,994 | A | * | 9/1999 | Staker et al. | 343/700 MS |
| 6,531,980 | B1 | * | 3/2003 | Jones | 342/157 |
| 7,012,572 | B1 | * | 3/2006 | Schaffner et al. | 343/725 |
| 2004/0001021 | A1 | * | 1/2004 | Choo et al. | 343/700 MS |

FOREIGN PATENT DOCUMENTS

| | | |
|---|---|---|
| EP | 0 333 166 A1 | 9/1989 |
| EP | 0 340 429 A1 | 11/1989 |
| EP | 0 617 480 A1 | 9/1994 |
| EP | 0 899 814 A1 | 3/1999 |
| EP | 1 102 350 A2 | 5/2001 |
| WO | 2007/103589 A2 | 9/2007 |

OTHER PUBLICATIONS

Wade, Paul, "The W1GHZ Online Microwave Antenna Book", chapter 4 entitled "Parabolic Dish Antennas", copyright 1994 and 1998.*
Wade, Paul, "The W1GHZ Online Microwave Antenna Book", chapter 6 entitled "Feeds for Parabolic Dish Antennas", copyright 1994, 1997, 1998,1999.*

* cited by examiner

*Primary Examiner* — Jack W Keith
*Assistant Examiner* — Frank J McGue
(74) *Attorney, Agent, or Firm* — Baker & Hostetler, LLP

(57) ABSTRACT

The antenna with shared feeds for generating multiple beams includes a plurality of identical individual feeds spaced apart by a constant pitch, wherein the individual feeds are associated in identical subnetworks around a central individual feed, each subnetwork being intended to synthesize a beam, the individual feeds of each subnetwork being phase-coupled together by electromagnetic coupling, and two successive subnetworks include at least one individual feed in common and are offset by a distance corresponding to a predetermined number of pitches greater than or equal to one, being applicable in particular to the field of satellite telecommunications.

13 Claims, 5 Drawing Sheets

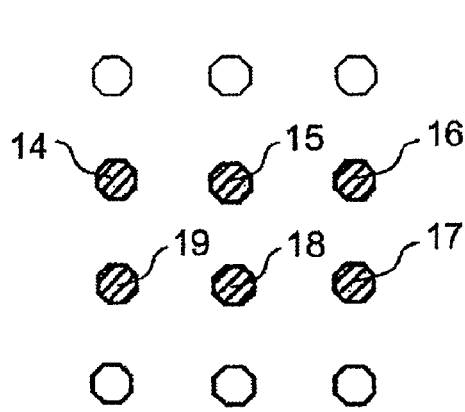 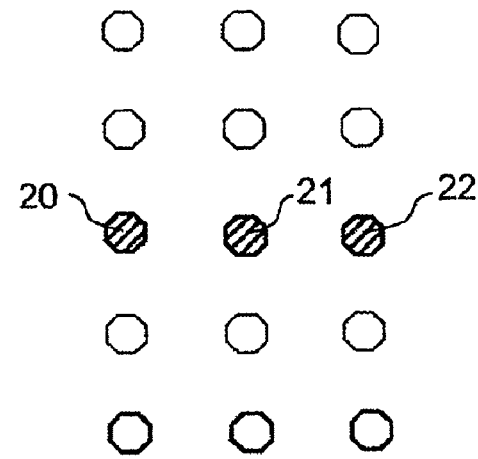
FIG.3a  FIG.3b
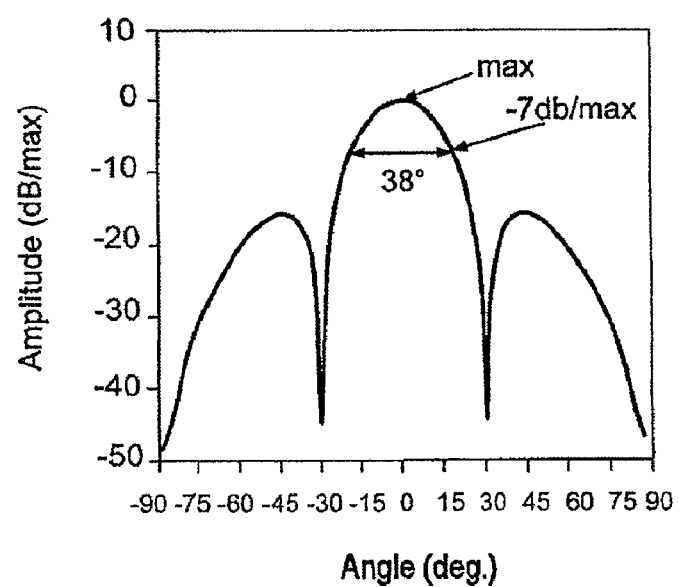
FIG.4

Projected diameter D

Focal length F

ANTENNA WITH SHARED FEEDS AND METHOD OF PRODUCING AN ANTENNA WITH SHARED FEEDS FOR GENERATING MULTIPLE BEAMS

CROSS-REFERENCE TO RELATED APPLICATIONS

This application claims priority of foreign French patent application no. FR 0806841, filed Dec. 5, 2008, the disclosure of which is hereby incorporated by reference in its entirety.

FIELD OF THE INVENTION

The present invention relates to an antenna with shared feeds and a method of producing an antenna with shared feeds for generating multiple beams. It applies notably to the field of satellite telecommunications.

BACKGROUND OF THE INVENTION

In the context of satellite telecommunications, the needs of the operators are moving towards smaller and smaller terminals, of A4 or A5 size, or terminals of PDA (Personal Digital Assistant) type or telephones, to reach roaming users.

Numerous applications also relate to the trend among existing systems for internet or high bit rate applications.

To achieve these missions, the antenna architectures are increasingly complex, comprise a large number of feeds associated with numerous amplifiers to ensure the generation of around a hundred or several hundreds of increasingly narrow beams and provide continent-wide or worldwide coverage. The beams are formed either with a digital beam forming network BFN on board the satellite, or via a ground-based beam forming GBBF device.

For narrowband applications and for low frequency bands below 10 GHz, such as the L or S bands, it is difficult to multiply the number of antennas given their large size, generally 9 to 15 m, or even 20 m, in diameter for the deployable reflectors. In this case, it is known to use one or two active antennas placed in front of the beam forming reflectors being produced either on board in an analogue or digital way or by a device on the ground.

For wideband applications and for high frequency bands greater than 10 GHz, the digitization techniques are limited in the on-board band processing capacity, in the complexity and technological feasibility of the beam forming network BFN and above all in the excess energy consumption at the payload level. Generally, the payload is configured passively with a structure whereby a feed corresponds to a particular beam. For reasons of inter-beam isolation constraints and gain performance reasons, this means multiplying the number of antennas on the satellite according to the frequency reuse scenario from one spot to another. This scenario is called three- or four-colour code and generally necessitates an antenna for each frequency subband, or colour, used.

It is known to use beam synthesis with a network of individual feeds placed at the focus of a parabolic reflector and by reusing feeds from one spot to another as described notably in the patents EP 0340429 and EP0333166. These architectures allow for the use of compact antennas with a low F/D ratio, F being the focal distance and D the diameter of the reflector, and make it possible to tighten the beams, but give strong aberrations in the case of unfocused operation.

It is also known to produce radiant structures comprising a set of individual feeds coupled together by electromagnetic radiations and making it possible to radiate waves in phase, as described notably in the patents EP0899814 and EP0617480. These structures are excited by an individual feed powered by a radio frequency-type excitation signal originating from a channel of the satellite's payload.

SUMMARY OF THE INVENTION

The aim of the present invention is to remedy the problems of the known beam forming systems and propose an antenna with feed sharing making it possible to generate a large number of narrow beams simply without using complex beam forming circuits, the beams ensuring a positioning of the spots with no coverage holes, the spots representing efficient C/I ratios, the ratio C/I being the ratio between the wanted signal C and the interfering signals I.

To this end, the subject of the invention is an antenna with shared feeds for generating multiple beams, comprising a plurality of identical individual feeds spaced apart by a constant pitch, wherein:

the individual feeds are associated in identical subnetworks around a central individual feed, each subnetwork being intended to synthesize a beam, the individual feeds of each subnetwork being phase-coupled together by electromagnetic coupling, and wherein at least two successive subnetworks include at least one individual feed in common and are offset by a distance corresponding to a predetermined number of pitches greater than or equal to one.

Advantageously, each subnetwork includes a single excitation feed.

According to one embodiment of the invention, the excitation feed is the central individual feed of each subnetwork.

According to one embodiment of the invention, the individual feeds are metallic patches deposited on a first face of a dielectric substrate comprising a second opposite face, parallel to the first face and mounted on a metallic plane forming a ground plane and the exciting feed is mounted on the second face of the dielectric, in line with the central individual feed of each subnetwork. The exciting feed can include an excitation slot etched into the ground plane in line with the central individual feed of each subnetwork.

According to another embodiment of the invention, the individual feeds are dielectric antennas.

The invention also relates to a method of producing an antenna with shared feeds as defined above for generating multiple beams, the antenna comprising a plurality of identical individual feeds spaced apart by a constant pitch, the method comprising the following steps:

choosing a diameter D for the parabolic reflector,
choosing a type of individual feed,
dimensioning and producing a subnetwork of several individual feeds around a central feed, the subnetwork being intended to synthesize a beam having a predetermined angular aperture, the feeds of the subnetwork being phase-coupled together with electromagnetic coupling,
choosing a number of offset pitches between two successive subnetworks, the number of pitches being greater than or equal to one and such that the two successive subnetworks include at least one individual feed in common,
determining a focal distance F for the parabolic reflector,
calculating the angular aperture of the beams corresponding to the choices made in the preceding steps and comparing theoretical performance of the antenna to desired performance.

Advantageously, if the theoretical performance does not correspond to the desired performance, the method furthermore consists in modifying the dimensions of the reflector to a value greater than the ratio F/D, in increasing the dimensions of the subnetwork, and therefore its directivity, proportionally to the focal distance of the reflector and in recalculating the new theoretical performance of the antenna with these new dimensions.

BRIEF DESCRIPTION OF THE DRAWINGS

Other particular features and benefits of the invention will become clearly apparent hereinafter in the description given by way of purely illustrative and nonlimiting example, with reference to the appended diagrammatic drawings which represent:

FIGS. 3a and 3b: diagrams of two examples of rectangular-mesh feed configuration, according to the invention;

FIG. 4: an example of theoretical radiation pattern obtained with a subnetwork comprising seven feeds distributed in a hexagonal mesh, according to the invention;

DETAILED DESCRIPTION

Figure 1:
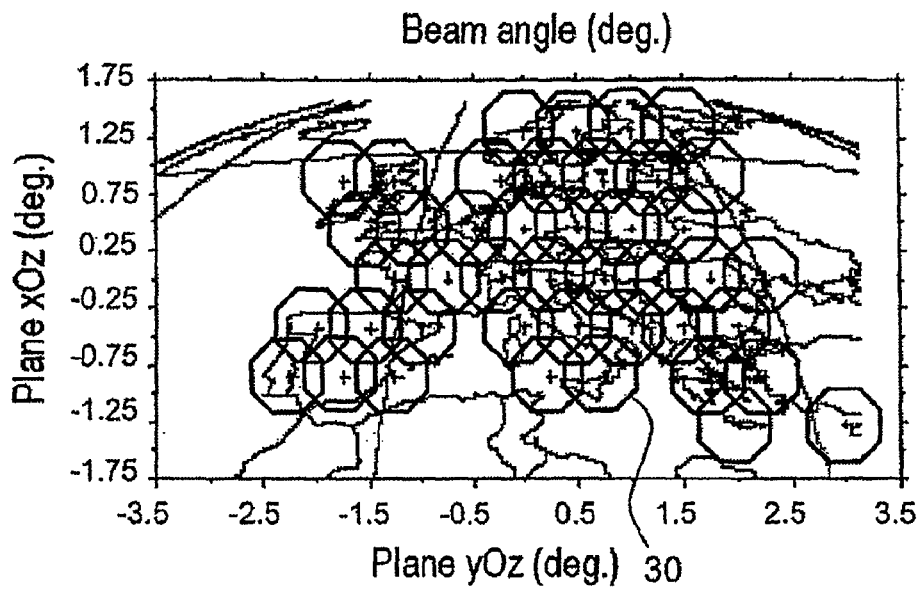
FIG. 1: a diagram of an example of coverage obtained with a configuration of around fifty spots, according to the invention.

The antenna architecture according to the invention must allow the transmission of information to terminals of very small size. The size of the terminals targeted dictates the values that the antenna parameters must have such as the ratio of the gain to the noise temperature G/T, called figure of merit, and the equivalent isotropic radiated power EIRP. For a given geographic coverage and a given frequency, the G/T parameter directly depends on the number of beams to be generated. Consequently, a fixed frequency band and G/T value have a corresponding number of beams and a beam size needed to produce a given coverage. FIG. 1 shows an example of coverage obtained with a configuration of forty-three spots 30, the spots 30 corresponding to beam angles $\ominus$ equal to 0.5°. To produce optimum coverage, all the spots must touch, or even be interlaced, and the gain of the antenna must be optimized to the hollows of each mesh corresponding to the intersection between three spots in the case of a triangular or hexagonal mesh.

Figure 9:
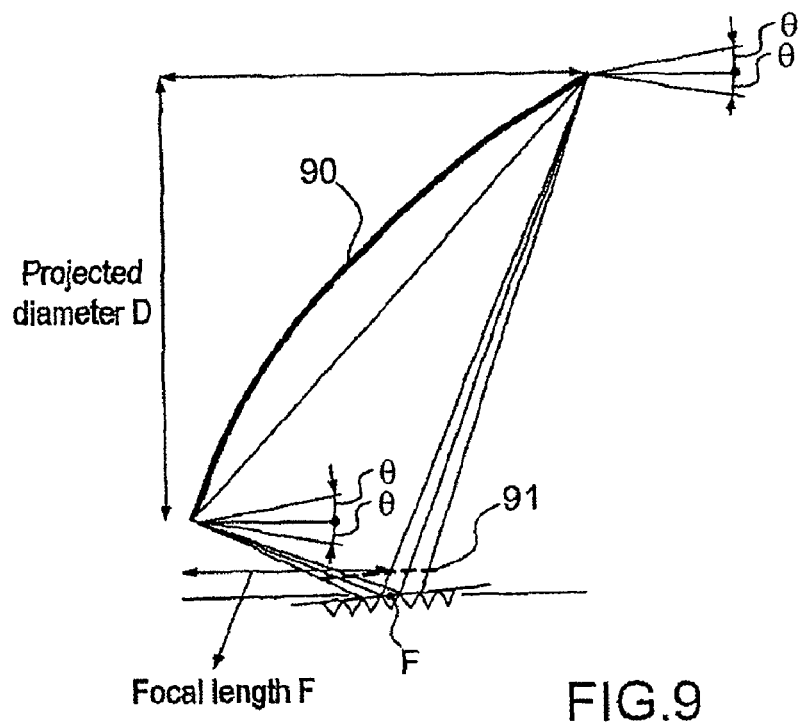
FIG. 9: an example of antenna comprising a multiple-feed network placed in the focal plane of a parabolic reflector.

The size required for the spots demands a minimum dimensioning for the diameter of the parabolic reflector 90 to be used to focus the energy. It then remains to define the feed or the network of individual feeds that will be placed in the focal area F of the reflector and that will have to illuminate this reflector in a multiple-spot configuration. FIG. 9 shows an example of antenna comprising a multiple-feed network 91 placed in the focal plane of a parabolic reflector.

The feed must synthesize a focal spot induced by the parabolic reflector in the vicinity of its focal plane. However, the bulk of a conventional feed, like that used in the antennas where a feed corresponds to a beam, does not allow the spots to be positioned so that they touch. For the spots to touch, the size of the feeds must be reduced in order to tighten the beams, but to the detriment of the overall efficiency of the antenna, because in this case, the feeds illuminate the edge of the reflector at levels close to or less than −3 dB relative to the maximum. The efficiencies obtained are then of the order of 25 or 30%, which is unacceptable.

Figure 2A:
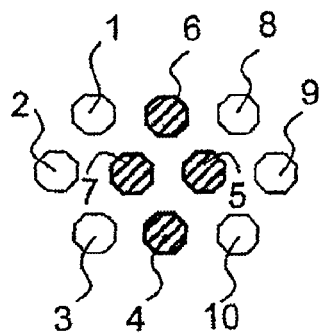
FIGS. 2a, 2b, 2c: diagrams of three examples of hexagonal-mesh feed configuration, according to the invention.
Figure 2B:
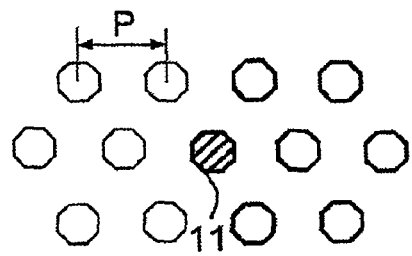
Figure 2C:
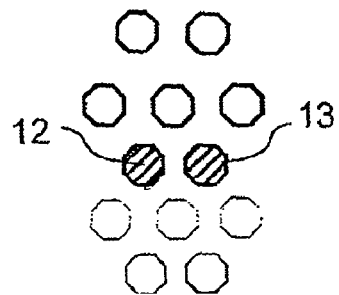

So as not to multiply the number of antennas on the satellite, the invention consists in using a new configuration of feeds making it possible to reuse individual feeds from one spot to another spot and to thus tighten the beams. FIGS. 2a, 2b, 2c represent plan view diagrams of three examples of hexagonal mesh feed configuration according to the invention.

These figures show a number of patch-type individual feeds. The individual feeds are all identical, spaced apart by a constant pitch P, and are grouped together in two subnetworks of seven individual feeds, some shared between the two subnetworks. In FIG. 2a, the first subnetwork consists of the feeds 1 to 7 and the second subnetwork consists of the feeds 4 to 10, with the four individual feeds 4 to 7 being shared between the two subnetworks, the other individual feeds 1 to 3 and 8 to 10 being independent. In FIG. 2b, a single feed 11 is shared; in FIG. 2c, two feeds 12, 13 are shared. In these examples, each subnetwork consists of a central individual feed surrounded by six peripheral individual feeds forming a hexagonal mesh. The two subnetworks are offset from one another by a translation corresponding to a selected number of pitches P, for example the offset can be chosen to be equal to a pitch as represented in FIG. 2a or to two pitches as represented in FIGS. 2b and 2c. Each subnetwork is intended to synthesize a beam corresponding to a spot on the ground. Thus, for example in the case of FIG. 2a, each spot will be produced by three independent individual feeds and four shared individual feeds, all the individual feeds of one and the same subnetwork being powered in phase and with the same amplitude. The reuse of shared individual feeds from one subnetwork to another subnetwork makes it possible to tighten the beams and obtain spots that touch. In the example represented in FIG. 2a, the synthesized beams will be the tightest because there are four shared individual feeds out of the seven used to generate a spot.

The configurations and the number of individual feeds used to synthesize a beam are not limited to the examples represented in FIGS. 2a, 2b, 2c. It is also possible to choose a square mesh or a rectangular mesh, as represented for example in FIGS. 3a and 3b, with a number of individual feeds different from seven and a number of shared individual feeds different from one, two or four. Thus, in FIG. 3a, each subnetwork comprises nine individual feeds of which six individual feeds 14 to 19 are shared, and in FIG. 3b, each subnetwork comprises nine individual feeds of which three individual feeds 20 to 22 are shared.

When the geometry of the subnetworks is chosen, the offset distance between two consecutive subnetworks makes it possible to determine the relative positions of the centres of the two spots that will be radiated by these two subnetworks and deduce therefrom, in a known manner, the focal distance F of the parabolic reflector 90 to be used. In the case where the beam angle $\ominus$ is chosen to be equal to 0.5°, so that the spots touch, it is essential for the distance between the centres of the two spots to correspond to an angular distance of 0.5°. These conditions make it possible to achieve, in a known manner, possibly after a number of iterations, a particular value of the F/D ratio to be produced for the reflector 90.

Figure 5:
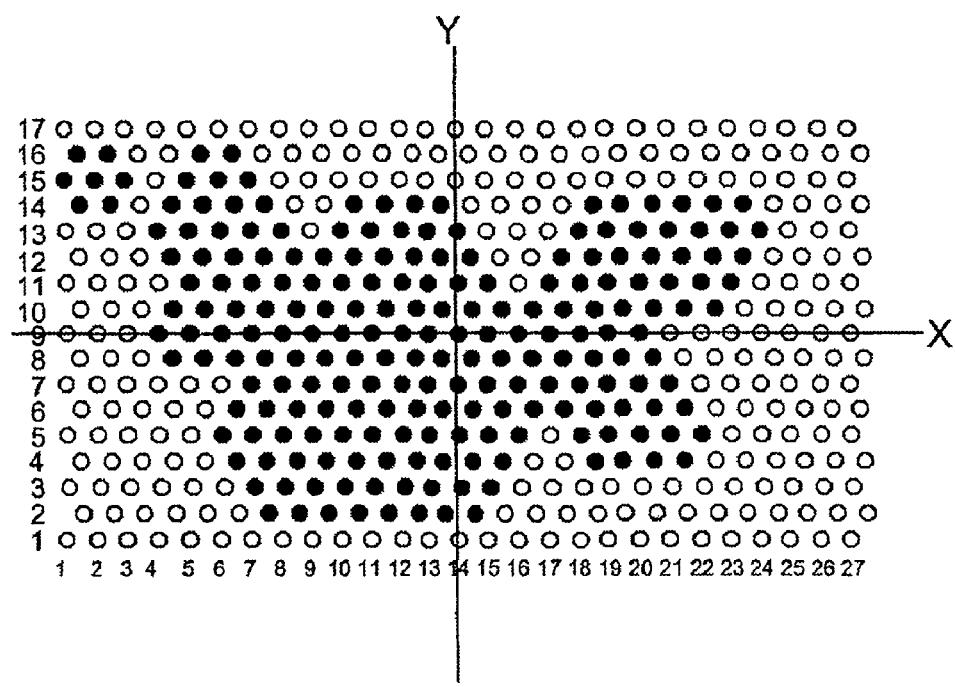
FIG. 5: an example of coverage of Europe with a focal network configuration with 43 beams corresponding to 43 spots, according to the invention.

As a nonlimiting example, to sample Europe with fifty or so beams having a beam angle $\ominus$ equal to 0.5°, with a choice of hexagonal mesh with seven patch-type individual feeds, the centres of two consecutive patches being spaced apart by a pitch equal to 0.85λ, λ being the operating wavelength, the patches having a directivity equal to 9 dBi (9 dB relative to an isotrope antenna), the offset between two consecutive subnetworks being equal to two pitches and for a frequency equal to 6 GHz, a reflector is needed that has a focal length of 9260 mm, or an F/D ratio equal to 1.42. In this case, the pitch separating the centres of two consecutive patches is equal to 42.7 mm and the offset between two subnetworks is equal to 85.4 mm and corresponds to a pointing of a second beam at 0.5° from a first beam. The theoretical radiation pattern obtained with a subnetwork whose geometrical parameters correspond to the above example and represented in FIG. 4, shows that the subnetwork lights the reflector with an amplitude equal to −7 dB relative to the maximum over an angle of 38° approximately. The subnetwork produced in this way is therefore satisfactorily adapted relative to the reflector. The various dimensioning parameters thus defined in this example make it possible to produce a coverage of Europe with a focal network configuration with 43 beams corresponding to 43 spots, as represented in FIG. 5. Since each beam is produced by a subnetwork consisting of a group of seven individual feeds distributed in a hexagonal mesh and two consecutive subnetworks being offset by two individual feeds, the number of individual feeds needed to synthesize the 43 beams is equal to 209 individual feeds. For comparison purposes, it would have been necessary to use 301 individual feeds if there had not been any shared feeds between two consecutive beams, the 301 feeds corresponding to the simple product of the number of beams by the number of individual feeds needed to synthesize a beam (43×7=301). The sharing of the individual feeds therefore makes it possible to reduce the complexity of the antenna and of the beamforming circuits.

The sharing of the feeds can be done in different ways such as, for example, by means of orthogonal BFNs, by means of a change of polarization between a first beam and a second beam that have one or more shared feeds, or by power supply fault for the shared feed when generating the second beam. In the case of a power supply fault for the shared feed, a first beam is generated by seven individual feeds and a second beam adjacent to the first beam is generated by six individual feeds.

To achieve the sharing of the feeds in a simple way, the invention consists in coupling together the individual feeds of one and the same subnetwork by electromagnetic coupling.

With this approach, and in a very effective manner, the individual feeds coupled together in one and the same subnetwork form one feed, called composite feed, with directivity suited to the radiation towards the reflector, while observing the physical and geometric constraints associated with the positioning of the beams over the coverage area, that is to say corresponding to pitches less than those recommended by the desired directivity.

Figure 6:
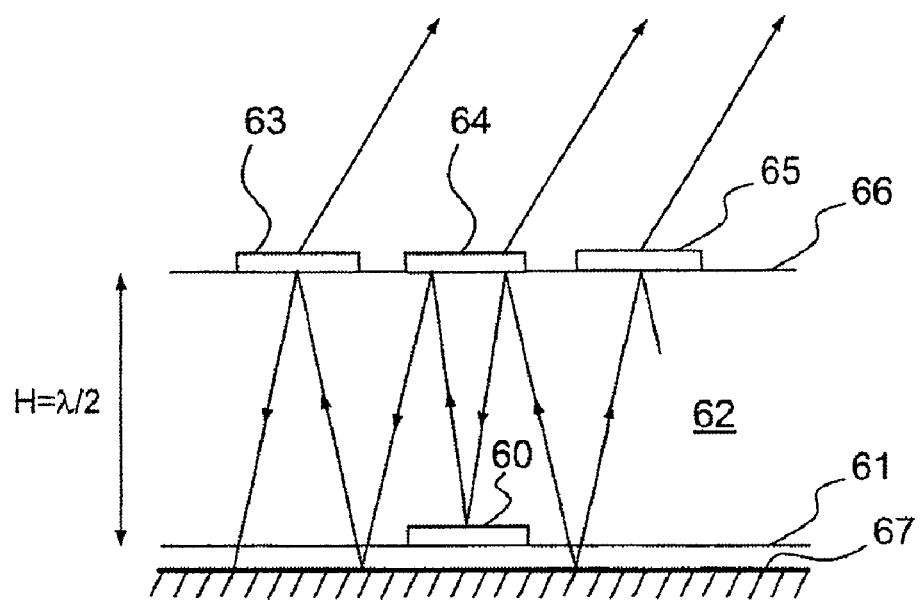
FIG. 6: a first example of excitation of a subnetwork comprising a number of patch-type individual feeds, according to the invention.

To couple the feeds together, the individual feeds of each subnetwork can be excited by an exciting feed powered by an excitation signal as represented for example in FIG. 6. In this figure, the exciting feed 60 is a patch deposited on a first face 61 of a dielectric substrate 62 and the individual feeds of the subnetwork are patches 63, 64, 65 deposited on a second opposite face 66 of the dielectric substrate 62 and parallel to the first face 61. All the patches 63, 64, 65 are identical and the exciting feed 60 is arranged in line with the central individual feed 64 of the subnetwork, which means that the centres of the two patches 60, 64 are on the same normal to the plane of the parallel faces of the dielectric substrate 62. The height H of the structure supporting the feeds excited by coupling is approximately at a distance equal to $\lambda/2$, $\lambda$ being the excitation wavelength in a void. The exciting feed 60 is at a short distance from a conductive surface 67 forming a ground plane. In this example, the exciting feed 60 is a metallic patch, but the excitation could also be produced by a slot produced in the ground plane 67 or by a dielectric resonator. The assembly consisting of the dielectric substrate 62 and the patches 60, 63, 64, 65 constitutes a wave guide operating at a particular frequency of wavelength $\lambda$. Accurate management of the impedance of the structure as a whole can be achieved for example by irises, not represented, implanted in the dielectric substrate to allow it to be matched. The electrical power signal for the exciting feed 60 can be routed for example via a coaxial or microstrip or tri-plate transmission line that is not represented.

This structure makes it possible, by powering a single exciting feed for each subnetwork, the exciting feed being arranged under the central individual feed, to phase-couple the individual feeds of the subnetwork, for example seven of them for a hexagonal mesh, and thus generate beams with increased directivity without using complex BFN circuits, the topology of which soon becomes inextricable when the degree of sharing of the feeds between a number of beams become high, such as, for example, in the case of the central spots of FIG. 1. The sharing of the feeds is then done naturally by electromagnetic coupling between the individual feeds of the subnetwork concerned.

The coupling together of the feeds can also be produced by powering the central individual feed of each subnetwork. The other individual feeds of the subnetwork surrounding the central individual feed are then powered by electromagnetic radiation from the central individual feed to the peripheral individual feeds. This electromagnetic radiation induces currents on the peripheral individual feeds which causes the individual feeds to be coupled together. When the feeds are in phase, the overall radiation of all the individual feeds of the subnetwork synthesizes a beam with increased directivity without using BFN circuits.

Figure 7A:
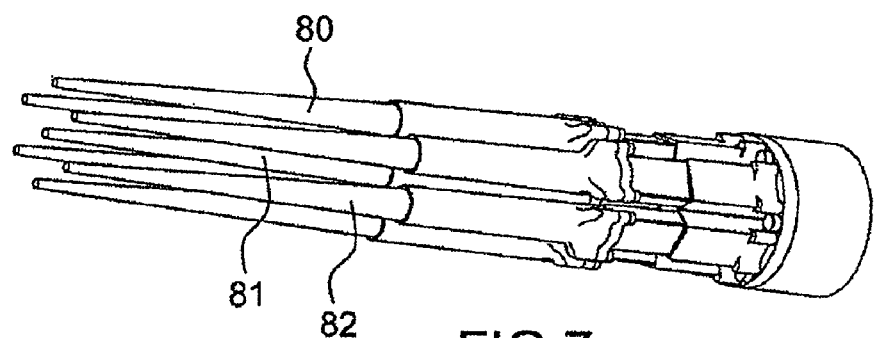
FIGS. 7a and 7b: two schematic views, respectively in perspective and from the front, of an example of subnetwork comprising a number of individual feeds of dielectric antenna type, according to the invention.
Figure 7B:
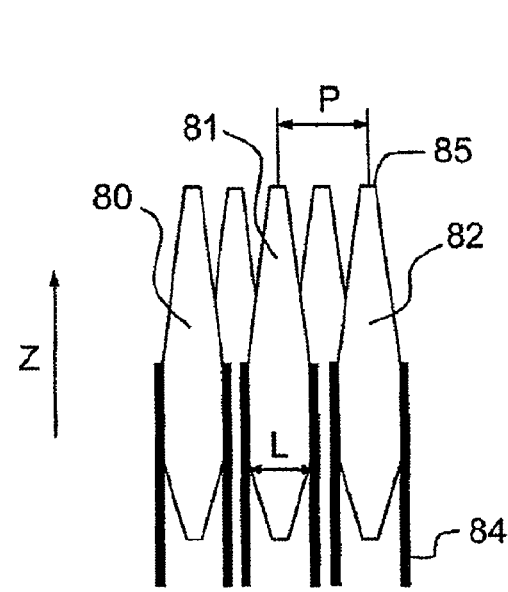
Figure 8A:
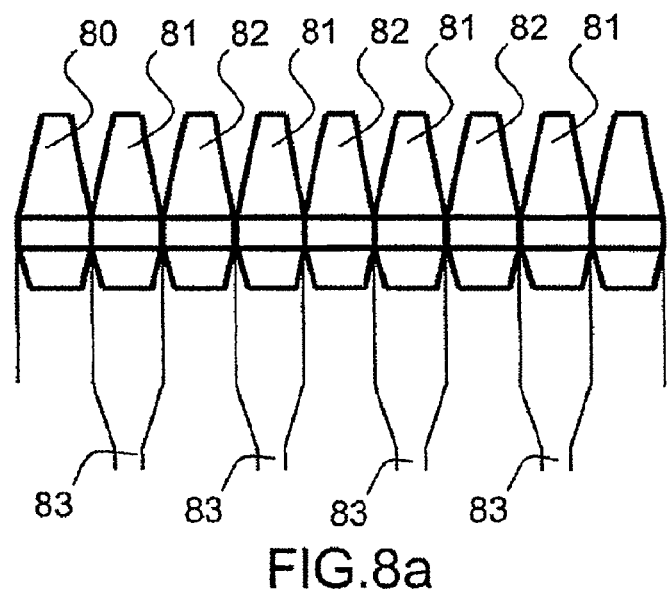
FIGS. 8a and 8b: two schematic views respectively in transverse cross section and in plan view, of an example of focal network comprising a number of subnetworks of dielectric antennas, according to the invention.
Figure 8B:
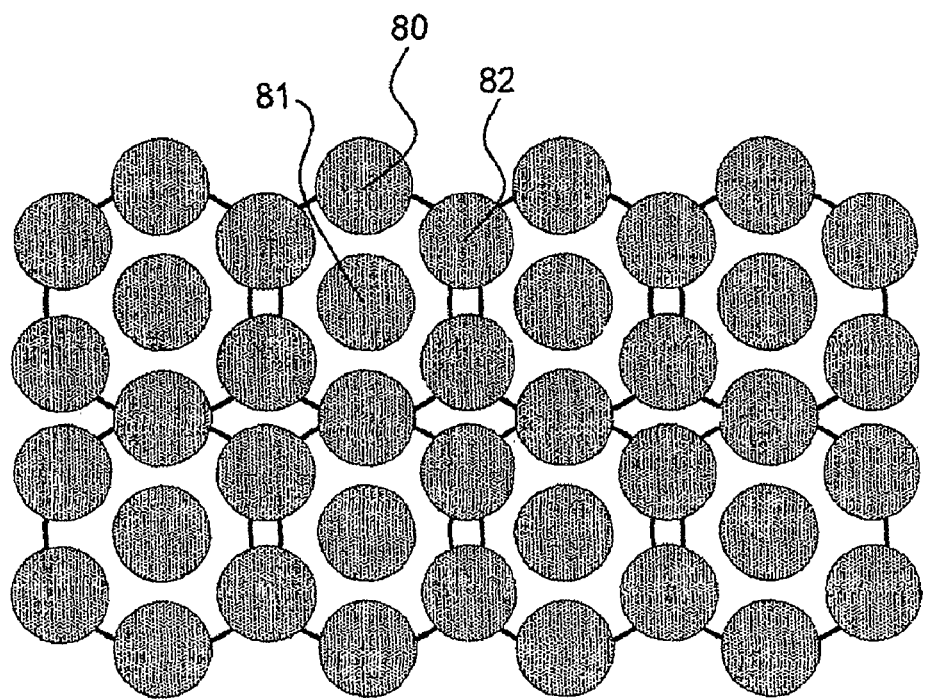

The invention is not limited to patch antennas. It is also possible to use horn antennas or dielectric antennas, also called dielectric-rod antennas. FIGS. 7a and 7b show two diagrammatic views, respectively in perspective and from the front, of an example of subnetwork comprising a number of individual feeds 80, 81 of dielectric antenna type and FIGS. 8a and 8b two diagrammatic views, respectively in transverse cross section and in plan view, of an example of focal network with shared feeds comprising a number of subnetworks of seven individual feeds of dielectric antenna type arranged in a hexagonal mesh. In the same way as for the patches, the invention consists in powering, at a bottom end 83, the central dielectric antenna 81 with a mesh that is for example hexagonal, and the peripheral dielectric antennas 80, 82 belonging to this same hexagonal mesh are naturally coupled together and to the central dielectric antenna 81, by electromagnetic coupling. For example, for an internal diameter L of each individual dielectric antenna equal to 7.4 mm or to 10 mm, the pitch P between the centres of two consecutive dielectric-rod antennas can then be equal to 16 mm. In the context of dielectric-rod antennas, the wave, generated by the power supply to the central dielectric-rod antenna 81, is propagated along an axis z of the dielectric antenna by being contained within the dielectric-filled wave guide with a diameter of 7.4 mm or 10 mm and delimited by the metallic walls 84 securing the dielectric rod. The electromagnetic coupling between the dielectric rods is obtained by a decontainment of the wave within a decontainment area situated at a top end 85, level with the output cone of the dielectric rods where the metallic walls 84 disappear. In the decontainment area, the fields deriving from the central exciting dielectric antenna 81 will naturally be spread in transverse mode, be coupled to the surrounding dielectric antennas 80, 82 and induce mutual couplings that contribute to the ultimate radiation of all the antennas of the mesh. The closure impedance of the induced dielectric antennas 80, 82 is determined so as to give, in overall behaviour, a desired increase in directivity. The whole then behaves as a subnetwork of seven dielectric bars consisting of one central bar 81 forming an exciting feed and six peripheral bars 80, 82 forming coupled feeds whose impedance conditions are determined so as to control the coupling and re-radiation coefficients of the dielectric antennas in accordance with the desired objectives of the duly obtained coupled subnetwork. In the examples of networks represented in FIGS. 8*a* and 8*b*, each subnetwork of seven feeds, arranged in a hexagonal mesh, comprises two peripheral feeds 82 shared with an adjacent subnetwork.

Although the invention has been described in relation to particular embodiments, it is obvious that it is by no means limited thereto and that it comprises all the technical equivalents of the means described and their combinations provided that the latter fall within the context of the invention. In particular, to further improve the performance of the antenna, the subnetwork can comprise a number of rings of peripheral feeds powered by electromagnetic coupling around a central feed.

What is claimed is:

1. An antenna with shared feeds for simultaneously generating multiple beams, comprising:
   a plurality of individual feeds arranged in a mesh and spaced apart by a constant pitch, wherein
   the individual feeds are associated in a plurality of subnetworks each consisting of a central individual feed included in the plurality of individual feeds and a plurality of peripheral individual feeds included in the plurality of individual feeds surrounding the central individual feed, each subnetwork being intended to synthesize a beam;
   the individual feeds of each subnetwork are phase-coupled together by electromagnetic coupling, so as to be excited together in phase; and
   each two adjacent subnetworks include at least one peripheral individual feed in common and are offset by a distance corresponding to a predetermined number of pitches greater than or equal to one.

2. The antenna according to claim 1, wherein the excitation feed is the central individual feed of each subnetwork.

3. The antenna according to claim 2, wherein the individual feeds are metallic patches deposited on a first face of a dielectric substrate comprising a second opposite face parallel to the first face and mounted on a metallic plane forming a ground plane.

4. The antenna according to claim 2, wherein the individual feeds are dielectric antennas.

5. The antenna according to claim 1, wherein the individual feeds are metallic patches deposited on a first face of a dielectric substrate comprising a second opposite face, parallel to the first face and mounted on a metallic plane forming a ground plane and wherein the exciting feed is mounted on the second face of the dielectric substrate, in line with the central individual feed of each subnetwork.

6. The antenna according to claim 1, wherein
   the plurality of individual feeds are arranged in a hexagonal mesh; and
   each individual feed is spaced from at least 3 adjacent individual feeds by the constant pitch.

7. The antenna according to claim 6, wherein
   each two adjacent subnetworks have only four individual feeds in common and have respective first and second central individual feeds adjacent to each other and spaced from each other by the constant pitch.

8. The antenna according to claim 6, wherein
   each two adjacent subnetworks have only one individual feed in common and have respective first and second central individual feeds each spaced from the common individual feed by the constant pitch.

9. The antenna according to claim 6, wherein
   each two adjacent subnetworks have only two peripheral individual feeds in common and have respective first and second central individual feeds each spaced from each of the common individual feeds by the constant pitch.

10. The antenna according to claim 1, wherein
    the plurality of individual feeds are arranged in a square mesh.

11. The antenna according to claim 1, wherein
    the plurality of individual feeds are arranged in a rectangular mesh.

12. A method of producing an antenna with shared feeds for simultaneously generating multiple beams, the antenna comprising a plurality of individual feeds arranged in a mesh and spaced apart by a constant pitch, said method comprising:
    choosing a diameter D for a parabolic reflector;
    choosing a type of individual feed;
    dimensioning and producing a subnetwork of several individual feeds around a central feed, the subnetwork for synthesizing a beam having a predetermined angular aperture, the feeds of the subnetwork being phase-coupled together with electromagnetic coupling;
    choosing a number of offset pitches between two successive subnetworks, the number of pitches being greater than or equal to one and such that the two successive subnetworks include at least one individual feed in common;
    determining a focal distance F for the parabolic reflector; and
    calculating the angular aperture of the beams corresponding to the choices made in the preceding steps and comparing theoretical performance of the antenna to desired performance, wherein
    the individual feeds are associated in a plurality of subnetworks, each consisting of a central individual feed included in the plurality of individual feeds and a plurality of peripheral individual feeds included in the plurality of individual feeds surrounding the central individual feed, each subnetwork being intended to synthesize a beam;
    the individual feeds of each subnetwork are phase-coupled together by electromagnetic coupling, so as to be excited together in phase; and
    each two adjacent subnetworks include at least one peripheral individual feed in common and are offset by a distance corresponding to a predetermined number of pitches greater than or equal to one.

13. The method according to claim 12, wherein, if the theoretical performance does not correspond to the desired performance, said method further comprises modifying the dimensions of the reflector to a value greater than the ratio F/D, increasing the dimensions of the subnetwork, and therefore its directivity, proportionally to the focal distance of the reflector and recalculating the new theoretical performance of the antenna with these new dimensions.

* * * * *